United States Patent

Hirsch

[11] Patent Number: 4,604,558
[45] Date of Patent: Aug. 5, 1986

[54] MOTOR DRIVE ASSEMBLY HAVING A FLOATING SWITCH ACTUATOR

[75] Inventor: George Hirsch, Fort Lee, N.J.

[73] Assignee: Vernitron Corporation, Lake Success, N.Y.

[21] Appl. No.: 758,731

[22] Filed: Jul. 25, 1985

[51] Int. Cl.[4] ............................................. H02P 7/00
[52] U.S. Cl. ...................................... 318/436; 318/9; 318/128; 318/558; 318/831
[58] Field of Search ................ 318/9, 12, 14, 15, 126, 318/127, 128, 436, 466, 475, 476, 489, 558, 830, 831, 40

[56] References Cited

U.S. PATENT DOCUMENTS

| | | | |
|---|---|---|---|
| 2,668,589 | 2/1954 | Illian | 318/466 |
| 3,930,133 | 12/1975 | Sulzer | 318/475 X |
| 4,417,185 | 11/1983 | Bullat | 318/466 X |
| 4,540,252 | 9/1985 | Hayashi et al. | 318/466 X |

FOREIGN PATENT DOCUMENTS 58-142404  8/1983  Japan .................................... 318/15

*Primary Examiner*—William M. Shoop, Jr.
*Assistant Examiner*—Bentsu Ro
*Attorney, Agent, or Firm*—Edward H. Loveman

[57] ABSTRACT

A motor drive assembly includes a stationary housing, a shaft rotatably carried by the housing for driving a load, a gear box rotatably carried by the shaft, and an electric motor in the gear box having a rotor coupled by a gear train to the shaft. A switch in the housing near the gear box is operated when the gear box rotates against a spring bias in response to the rotor's exerting an increased predetermined torque. The motor may have an auxiliary winding in circuit with the switch to reduce power consumed by the motor when the switch is operated. Alternatively, a solenoid may be connected to the switch to hold the rotor stationary when the motor stops. The motor may have a main drive winding which is de-energized by the switch.

12 Claims, 6 Drawing Figures

MOTOR DRIVE ASSEMBLY HAVING A FLOATING SWITCH ACTUATOR

FIELD OF THE INVENTION

This invention relates to the art of motor drives wherein a load is driven to a stop position where the rotor of the motor is then held stationary while the motor remains energized or is turned off; and more particularly, concerns a motor drive having a movable housing which turns in response to a rise in torque of the motor above driving torque, to operate a switch which actuates an associated circuit.

BACKGROUND OF THE INVENTION

In a conventional industrial damper installation, a gear driven induction motor drive opens the slats of the damper and holds them in open position continuously for long time periods. The motor runs while it is opening the damper. After the damper is open, the motor remains continuously energized exerting torque on the load while the rotor and associated gear train are held in locked or stalled position. A conventional induction motor for a damper or other application will experience its highest power consumption when the rotor is stalled or held stationary, which often results in overheating the motor and motor burnout.

SUMMARY OF THE INVENTION

The present invention has as one object to reduce and minimize the consumption of energy of a drive motor of a load such as a damper assembly when the motor is exerting a torque greater than a prdetermined torque, and to hold the load in that position. According to the invention, the motor may be provided with an auxiliary winding connected to a switch adjacent to and actuated by a movable housing which carries the motor. The switch is connected to the power supply circuit of the main drive winding and an auxiliary winding of the motor. The auxiliary winding is deenergized when the main winding is energized to drive the load. When the torque exerted by the rotor of the motor increases above a predetermined torque, it causes the motor housing to move and operate an adjacent switch which energizes the auxiliary winding. The auxiliary winding requires a reduced current which minimizes power drain, while the rotor of the motor is stalled. Heat dissipated in the motor is minimized, so that the motor can remain in stalled condition for long periods of time without damage.

In another embodiment, the auxiliary winding is replaced by a solenoid which locks the rotor of the motor in a stationary position. The solenoid is energized and the motor drive winding is de-energized, via the switch disposed adjacent to the movable housing. In a further embodiment, the invention is applicable to traverse drapes, retractable and extensible antennas, and other installations where a load is moved until a predetermined torque is reached, whereupon, a movable motor housing actuates an adjacent switch which turns off the motor.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENTS

Figure 2:
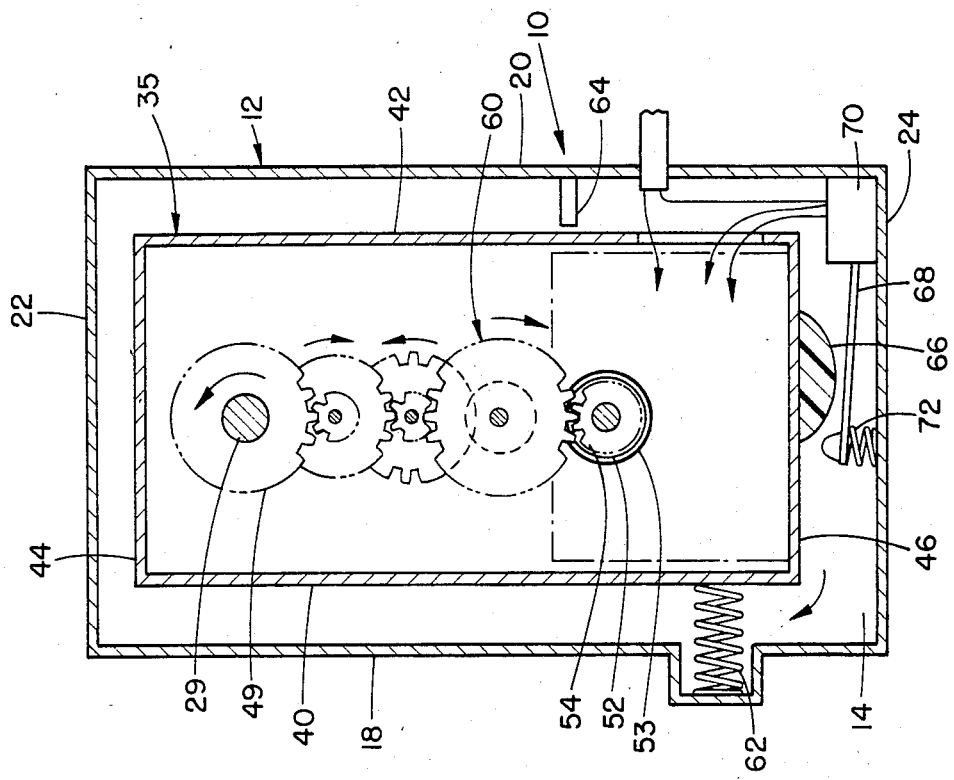
FIG. 2 is a vertical sectional view taken along line 2—2 of FIG. 1.
Figure 1:
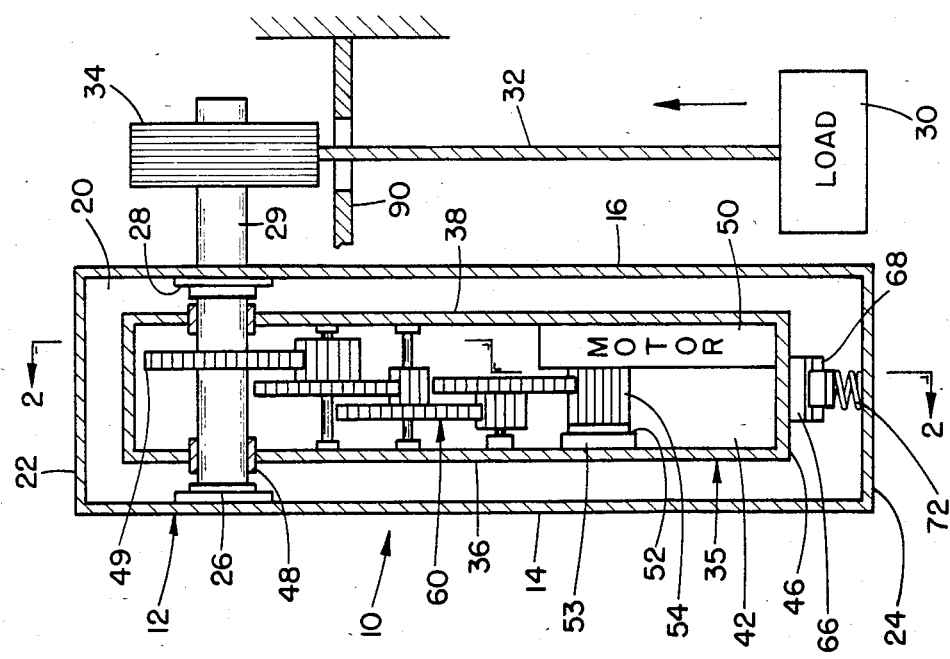
FIG. 1 is a vertical sectional view through a motor drive assembly embodying the invention.
Figure 3:
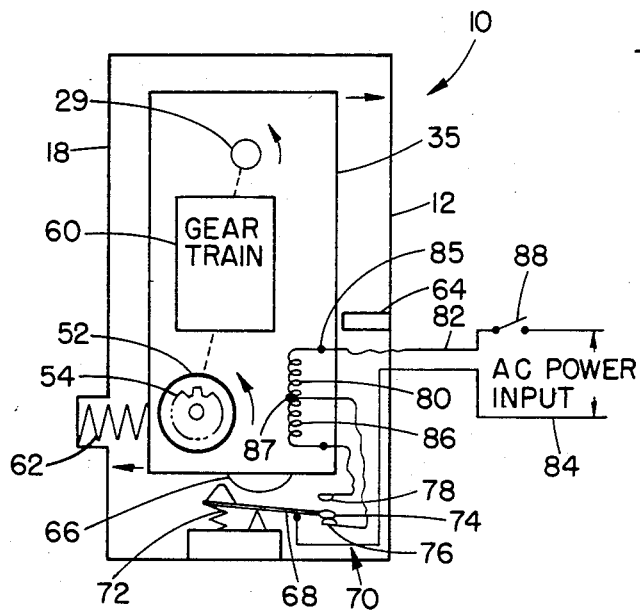
FIG. 3 is a reduced diagrammatic representation of the motor drive assembly of FIGS. 1 and 2, showing schematically an electrical circuit of the assembly.

Referring now to the drawings wherein like reference characters designate like or corresponding parts throughout, there is illustrated in FIGS. 1, 2, and 3 an assembly generally designated by reference numeral 10 including a rather flat rectangular stationary housing 12 having parallel spaced vertical side walls 14, 16; end walls 18, 20; a top wall 22 and a bottom wall 24. Rotatably supported by bearings 26, 28 on the side walls 14, 16 and extending through the wall 16 is a drive shaft 29 for driving a load 30. In this instance the load 30 is shown connected to the shaft 29 by a cable 32 wound on a pulley 34.

A gear box 35 is rotatably mounted around the shaft 29 inside the housing 12. The gear box 35 is rather flat and rectangular with spaced parallel vertical side walls 36, 38; end walls 40, 42; a top wall 44 and a bottom wall 46. The box 35 swings freely on a pair of spaced bearings 48 each of which is fitted in one of the side walls 36, 38. The box 35 is rotatable around and independently of the rotatable shaft 29, which supports the box 35. Secured to the shaft 29 is a drive gear 49. Inside the box 35 is mounted a motor 50 having a rotor 52 supported by a bearing 53 and driving a splined gear 54. The gear 54 drives a train 60 of gears, which drive the gear 49 so that the motor 50 is operatively connected to and drives the shaft 29 via the gears 49, 54, and the gear train 60.

The gear box 35 can angularly turn clockwise as viewed in FIGS. 2 and 3 against the bias exerted by a spring 62 mounted on the housing end wall 18 and bearing against the end wall 40 of the gear box 35. A stop member 64 may be provided on the opposite end wall 20 of the housing 12 near the end wall 42 of the box 35 to stop counterclockwise rotation of the gear box 35.

At the bottom wall 46 of the gear box 35 is mounted a block 66 disposed to depress an adjacent arm 68 of a switch 70 mounted at the bottom of the housing 12. The arm 68 pivots against the bias of a spring 72. The switch 70 has a single movable pole or contact 74 and two spaced fixed contacts 76, 78. The contact 76 is connected in direct circuit with a main drive winding 80 of the motor 50. Lines 82, 84 of an A-C power supply are connected respectively to one end 85 of the winding 80 and to the movable pole 74 of the switch 70.

Figure 4:
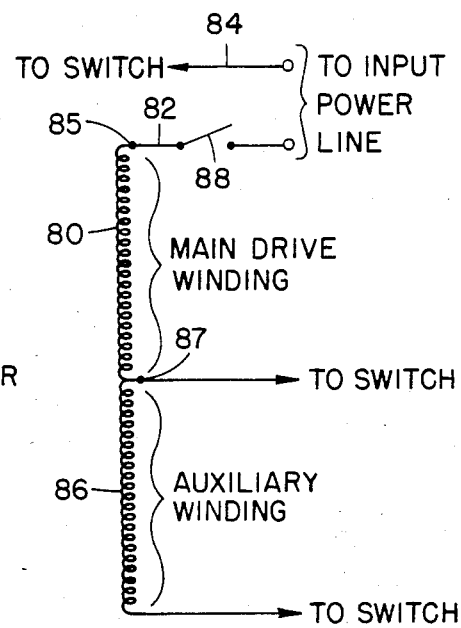
FIG. 4 is a schematic diagram of parts of the electrical circuit shown in FIG. 3.

An auxiliary winding 86 is also provided in the motor 50. The winding 86 is connected between the switch contact 78 and the other end 87 of the winding 80; see FIGS. 3 and 4. The winding 86 is designated a stall or holding winding. A power line switch 88 is further provided for turning the power supply on and off. Pole 74 is normally closed with the contact 76 to drive the motor 50 while the winding 87 is open circuited at the contact 78.

In operation of the assembly 10 as illustrated in FIGS. 1-4, suppose the assembly 10 is installed in an air inlet system in which the load 30 constitutes a plurality of damper slats or louvers which are lifted by the cable 32 when the shaft 29 is driven by the motor 50 and the gears 49, 54, and a gear train 60 in one direction, clockwise as viewed in FIGS. 2 and 3. Suppose that the load 30 reaches the upward limit of its travel at a stationary abutment 90; see FIG. 1. At this point, the shaft 29 will stall and the rotor 52 of the motor 50 will exert increased torque. The increased torque causes the gear box 35 to turn in counterclockwise direction as viewed in FIGS. 2 and 3 against the bias of the spring 62. As the gear box 35 turns, the block 66 operates the switch 70 by pivoting the arm 68 to open the contacts 74, 76 and close the contacts 74, 78. This connects the auxiliary winding 86 in series with the winding 80 and the power supply. The current drawn by the motor 50 is instantly and sharply reduced so that the motor 50 exerts a reduced torque. This torque is much less than that required to raise the load 30. Thus, the load 30 can remain for an indefinite, extended period of time in lifted position, while the motor 30 is energized but consumes a minimum amount of power. The connection of the high resistance winding 86 in series with the main drive winding 80 prevents burnout of the winding 80.

If the switch 88 is opened or the power supply is otherwise cut off, the power applied to the winding 86 will be cut off; the motor 50 will become de-energized and the spring 62 will move the gear box 35 counterclockwise to cause the switch 70 to be operated again. Now, the switch contacts 74, 76 and 78 will return to the condition illustrated in FIG. 3, where the contact 74 is closed with the contact 76, and the contacts 74 and 78 are open circuited along with the winding 86.

It will be understood from the foregoing that the operation of the system depends on a momentary increase in torque exerted by the motor 50 in excess of the predetermined torque required to drive the shaft 29, so that the gear box 35 turns to operate the switch 70 which actuates the circuit connected to the switch 70. Upon operation of the switch 70, the torque exerted by the motor 50 drops to a low magnitude where little power is consumed and little heat is generated in the motor 50. Nevertheless, this reduced torque is sufficient to hold the gear box 35 in turned position to keep the holding or stall winding 86 energized via the switch 70.

Figure 5:
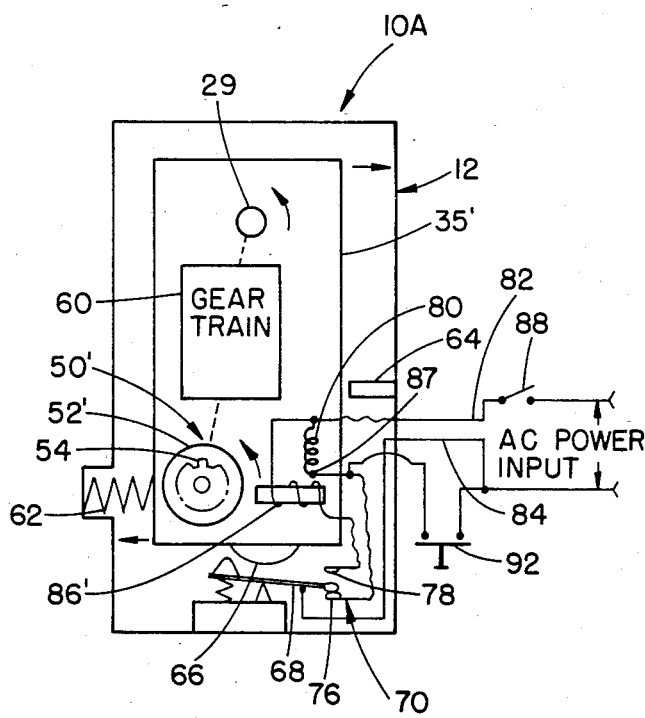
FIG. 5 and 6 are diagrams similar to FIG. 3 illustrating two other embodiments of the invention.

FIG. 5 illustrates an assembly 10A embodying a modification of the invention where the holding winding 86 is replaced by a solenoid 86', which is disposed adjacent to a rotor 52' of a motor 50' to hold the rotor 52' and prevent it from rotating when the solenoid 86' is energized. The solenoid 86' is connected between the power supply line 82 and the normally open contact 78 of the switch 70. The winding 80 is connected between the power supply line 82 and the switch contact 76. A pushbutton switch 92 is connected between the winding terminal 87 and the power supply line 84. Other parts of the assembly are as shown and described in FIGS. 1, 2, and 3.

Operation of assembly 10A is similar to that of the assembly 10 described above, except that the main drive winding 80 is completely de-energized, and only the solenoid 86' is energized to keep the rotor 52' of the motor 50' from turning after the gear box 35' turns. To reactivate the motor 50' to drive the stalled shaft 29, the pushbutton switch 92 will be closed momentarily. This will apply power to the winding 80 to start the motor 50' which will cause the gear box 35' to turn counterclockwise. The switch 70 will then operate to open the power supply circuit of solenoid 86' and to close the power supply circuit of the motor drive winding 80. Release of the pushbutton 92 will allow the motor 50' to drive the load continuously until the stop position of the load is reached when the switching cycle will be repeated.

Figure 6:
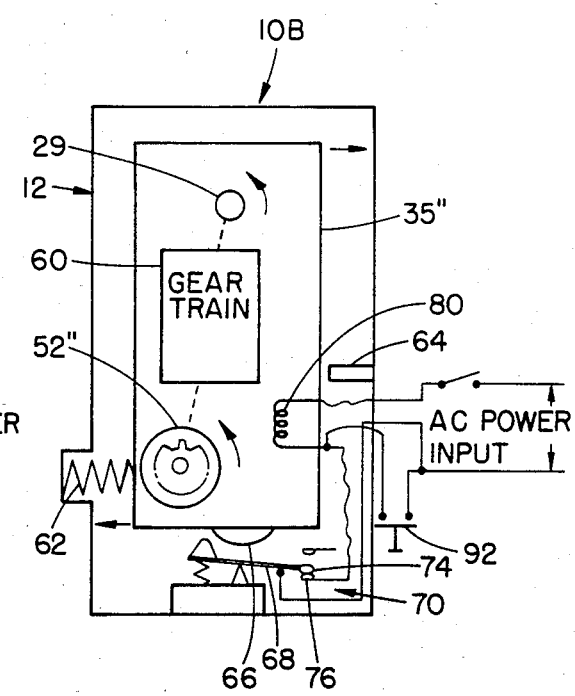

FIG. 6 shows another assembly 10B is similar to assemblies 10 and 10A, except that both the auxiliary winding 86 and the solenoid winding 86' are omitted. This assembly is adapted for installations such as drive systems for traverse drapes, sliding or rotating antennas, etc, where no torque is exerted on the drive shaft 29 and the rotor 52" after the load reaches is stopped position. When the stopped position of the load is reached, the momentary increase in torque exerted by the rotor 52" causes the gear box 35" to turn counterclockwise to operate the switch 70 which opens the power supply circuit of the motor drive winding 80 by opening the switch contacts 74, 76. The motor 52" can be restarted by momentarily closing the switch 92 which will cause the gear box 35" to turn counterclockwise on the shaft 29, operating the switch 70 and closing the power supply circuit of the winding 80.

In all forms of the invention described, the switch 70 which actuates the associated circuit to reduce or cut off the power supply to the drive motor and to energize a holding winding or solenoid, is operated by turning the gear box in which the motor is mounted. In all cases the gear box turns when the torque exerted by the motor momentarily increase beyond the predetermined torque required to drive the load, until the turning gear box operates the adjacent switch.

It should be understood that the foregoing relates to only a limited number of preferred embodiments of the invention which have been by way of example only and that it is intended to cover all changes and modifications of the examples of the invention herein chosen for the purpose of the disclosure which do not constitute departures from the spirit and scope of the invention.

What is claimed is:

1. A motor drive assembly for a load, comprising:
    a first support;
    a shaft rotatably carried by said support for driving a load;
    a movable second support;
    an electric motor carried by said second support and having a rotor operatively coupled to said shaft to drive the same with predetermined torque;
    a circuit means; and
    a switch means carried by said first support, connected to said circuit means, and arranged to actuate said circuit means, said switch means being disposed adjacent to said second support for operation by said second support when said second support moves in response to said rotor's exerting torque greater than said predetermined torque.

2. A motor drive assembly as defined in claim 1, further comprising spring means arranged to apply bias to said second support to move the same and again operate said switch means for actuating again said circuit means, when torque exerted by said rotor falls below said predetermined torque.

3. A motor drive assembly as defined in claim 1, wherein said electric motor comprises a main drive winding and an auxiliary winding and wherein said circuit means is so connected to said switch means that said auxiliary winding is de-energized when said main drive winding is energized and driving said load, said circuit means being arranged to energize said auxiliary winding when said rotor is stopped, to minimize power drawn by said motor and to minimize heat dissipated in the motor.

4. A motor drive assembly as defined in claim 1, wherein said electric motor comprises a main drive winding and a solenoid, and wherein said circuit means is so connected to said switch means that said solenoid is de-energized while said main drive winding is energized and driving said load, said circuit means being arranged to energize said solenoid when said rotor is stopped while said main drive winding is de-energized, said solenoid being disposed adjacent said rotor to hold the same stationary when said load is in a stop position.

5. A motor drive assembly as defined in claim 1, wherein said motor comprises a main drive winding and wherein said circuit means is so connected to said switch means that said main drive winding is energized while said rotor is driving said load, and said main drive winding is de-energized when said rotor is stopped.

6. A motor drive assembly for a load, comprising:
a stationary housing;
a shaft rotatably carried by said housing for driving a load;
a gear box swingably carried by said shaft in said housing and angularly turnable on and independently of said shaft;
an electric motor in said gear box having a rotor operatively coupled by a gear train to said shaft to drive the same with predetermined torque;
a circuit means; and
a switch means carried by said housing connected to said circuit means and arranged to actuate the same, said switch means being disposed adjacent to said gear box for operation by said gear box when said gear box moves in response to said rotor's exerting torque greater than said predetermined torque.

7. A motor drive assembly as defined in claim 6, further comprising spring means carried by said housing and arranged to apply bias to said gear box to move the same and again operated said switch means for actuating again said circuit means, when torque exerted by said rotor falls below said predetermined torque.

8. A motor drive assembly as defined in claim 6, wherein said electric motor comprises a main drive winding and an auxiliary winding and wherein said circuit means is so connected to said switch means, that said auxiliary winding is de-energized while said main drive winding is energized and driving said load, said circuit means being arranged to energize said auxiliary winding when said rotor is stopped, to minimize power drawn by said motor and to minimize heat dissipated in the motor.

9. A motor drive assembly as defined in claim 6, wherein said electric motor comprises a main drive winding and a solenoid and wherein said circuit means is so connected to said switch means that said solenoid is de-energized while said main drive winding is energized and driving said load, said circuit means being arranged to energize said solenoid when said rotor is stopped while said main drive winding is de-energized, said solenoid being disposed adjacent said rotor to hold the same stationary when said load is in a stop position.

10. A motor drive assembly as defined in claim 6, wherein said motor comprises a main drive winding and wherein said circuit means is so connected to said switch means that said main drive winding is energized while said rotor is driving said load, and said main drive winding is de-energized when said rotor is stopped.

11. A motor drive assembly as defined in claim 8, wherein said switch means is a two-position single pole double throw switch, having a movable contact and two fixed contacts, said main drive winding and said auxiliary winding being connected to said two fixed contacts respectively, said movable contact being connectable to a power supply for energizing said main drive winding in one position of said switch and for energizing both of said windings in the other position of said switch.

12. A motor drive assembly as defined in claim 9, wherein said switch means is a two-position single pole double throw switch having a movable contact and two fixed contacts said main drive winding and said solenoid being connected to said two fixed contacts respectively, said movable contact being connectable to a power supply, said main drive winding and said solenoid being connectable to said power supply for energizing said winding and said solenoid alternately in each position of said switch.

* * * * *